United States Patent
Burstein et al.

[11] Patent Number: 5,826,105
[45] Date of Patent: Oct. 20, 1998

[54] SYSTEM FOR USING AN EXTERNAL CPU TO ACCESS MULTIFUNCTION CONTROLLER'S CONTROL REGISTERS VIA CONFIGURATION REGISTERS THEREOF AFTER DISABLING THE EMBEDDED MICROPROCESSOR

[75] Inventors: Steven Burstein, Smithtown; Kenneth George Smalley, Hauppauge; Ian Fraser Harris, Kings Park, all of N.Y.

[73] Assignee: Standard Microsystems Corporation, Hauppauge, N.Y.

[21] Appl. No.: 661,128

[22] Filed: Jun. 10, 1996

[51] Int. Cl.⁶ .................................................. G06F 13/00
[52] U.S. Cl. .................... 395/842; 395/183.06; 395/824; 395/830; 395/842
[58] Field of Search ................... 371/16; 395/183.06, 395/575, 183.16, 500, 824, 830, 842, 851

[56] References Cited

U.S. PATENT DOCUMENTS 4,312,066  1/1982  Bantz .
5,361,348  11/1994  Nakamoto .
5,479,652  12/1995  Dreyer .
5,544,311  8/1996  Harenberg .
5,630,102  5/1997  Johnson .

*Primary Examiner*—Thomas C. Lee
*Assistant Examiner*—Hassen A. Mia
*Attorney, Agent, or Firm*—Proskauer Rose LLP

[57]  ABSTRACT

A method is disclosed for giving a host CPU direct access to the address space of an embedded microprocessor in a multifunction controller. The data path of the multifunction controller chip is modified to enable this direct access.

8 Claims, 3 Drawing Sheets

SYSTEM FOR USING AN EXTERNAL CPU TO ACCESS MULTIFUNCTION CONTROLLER'S CONTROL REGISTERS VIA CONFIGURATION REGISTERS THEREOF AFTER DISABLING THE EMBEDDED MICROPROCESSOR

FIELD OF THE INVENTION

The present invention relates the operation of a multifunction controller chip. More particularly, the present invention relates to a data path in a multifunction controller chip in which a host CPU can access the address space of an embedded microprocessor in the multifunction controller chip without intervention of an embedded microprocessor.

BACKGROUND OF THE INVENTION

A conventional multifunction controller chip is schematically illustrated in FIG. 1. The multifunction controller chip 10 comprises a host interface 12 for interfacing with a host CPU 14 which is external to the multifunction controller chip 10. The multifunction controller chip 10 also comprises a plurality of independent devices 16. Examples of these devices are a floppy disk controller 16a, serial ports 16b, 16c, 16d, a mouse interface 16e, and a keyboard controller 16f. The multifunction controller chip may also include other devices such as a flash interface, a pulse width modulator, etc. These devices 16 are, for purposes of the present invention, entirely conventional. The devices 16 are controlled by a set of control registers 30. One or more of the control registers 30 are associated with each device 16.

The multifunction controller chip 10 comprises an embedded microprocessor or other embedded controller 20. Illustratively, the embedded microprocessor 20 is an 8051 microprocessor. The embedded microprocessor 20 normally controls the control registers 30, which in turn control the devices 16. The control registers 30 form at least part of the address space of the embedded microprocessor 20. This address space, is for example, 64k bytes.

The multifunction controller chip 10 also comprises the configuration registers 40. The configuration registers 40 are shown as a single unit for illustration purposes in FIG. 1. However, these configuration registers may be implemented in part in RAM, DATA ROM, PROGRAM ROM, and various other registers associated with the embedded microprocessor 20 and not shown in more detail in FIG. 1. Illustratively, the address space of the configuration registers is 256 bytes.

Also associated with the embedded microprocessor is a set of mailbox registers 42. The mailbox registers may be internal to the embedded microprocessor or external to the embedded microprocessor.

As is explained below, in a conventional multifunction controller chip, the mailbox registers 42 are utilized to enable the host CPU 14 to access the control registers 30.

The multifunction controller chip 10 also includes a clock generator circuit 44 for generating timing signals for the multifunction controller chip. There is also a power management circuit 46. The host interface 12, clock generator 44, power management circuit 46, configuration registers 40, mailbox registers 42, control registers 30, and embedded microprocessor 20, are all interconnected by a bus structure 50.

An illustrative device 16 and its associated control registers are shown in FIG. 2. The device 16 is a general purpose I/O (GPIO) device. Associated with the GPIO 16 are a plurality of control registers, 31, 32, 33, 34, 35, 36. These registers 31–36 are part of the control registers 30 of FIG. 1. In the conventional multifunction controller chip, the control registers 31–36 are generally only accessible by the embedded microprocessor. As is discussed below, in the present invention, at least some of these registers are directly accessible by the host CPU 14.

The GPIO 16 comprises two buffers, 17, 18 and a multiplexer 21. The output buffer 17 and the input buffer 18 are both connected to the I/O pin 19. The buffer 17 is controlled by the register 31. The multiplexer 21 outputs data from the register 33 or the register 34 to buffer 17 and is controlled by the register 32. The input buffer 18 receives data from the pin 19 and places this data in the register 35 and register 36.

In the conventional multifunction controller chip, access of the host CPU 14 to the control registers 30 is via the mailbox registers 42. It is notable, that this hand-shaking data path is only viable if the embedded microprocessor 20 is fully functional and is executing its program properly. Furthermore, each data transfer from a mailbox register 42 to a control register 30 executed by the embedded microprocessor 20 requires an interrupt from the mailbox register 42, a branch to the code that actually causes the embedded microprocessor to move data between the appropriate mailbox register and the appropriate control register, and a return to the original program being executed by the embedded microprocessor.

This type of transfer requires an embedded microprocessor, such as the 8051, to execute hundreds of instructions for a single transfer to be completed. This is a problem for both testing and debugging of a multifunction controller.

Accordingly, it is an object of the present invention to provide a modified multifunction controller in which the host CPU has access to the control registers of the independent devices without intervention of the embedded microprocessor.

In other words, it is an object of the invention to provide a multifunction controller which can be operated so that the host CPU has direct access to the address space of the embedded microprocessor.

SUMMARY OF THE INVENTION

In accordance with the present invention, the host CPU is able to access the control registers of a multifunction controller without intervention of the embedded microprocessor. This is accomplished in accordance with a preferred embodiment of the invention as follows:

1. The multifunction controller is placed in a configuration state by the host CPU. In the configuration state, two configuration ports associated with the host interface are enabled. One of these ports is the INDEX PORT which receives from the host CPU an address to a particular register in the configuration registers. Another of these ports is a DATA PORT which receives data to be written into or read from the address in the INDEX PORT.
2. The embedded microprocessor in the multifunction controller is then disabled. This is accomplished by writing a particular control bit into a particular register in the configuration registers.
3. The control registers of the independent devices are then directly accessed by the host CPU. Using the INDEX PORT and DATA PORT, an address of a particular one of the control registers is written into a first particular configuration register. Then data to be transferred to the particular control register from the host is written into a second particular configuration register (using the INDEX PORT and DATA PORT).

4. Then, the data in the second configuration register is directly transferred to the control register indicated by the address in the first configuration register.

In short, this technique in which the host directly accesses the control registers is known as the "bridge mode". The host CPU bridges across the configuration registers into the address space of the embedded microprocessor (i.e., the control registers).

The data path in the multifunction controller is modified with a multiplexer which permits either the configuration registers or the embedded microprocessor to access the control registers depending on the status of a particular control bit in a particular one of the configuration registers.

DETAILED DESCRIPTION OF THE INVENTION

Figure 3:
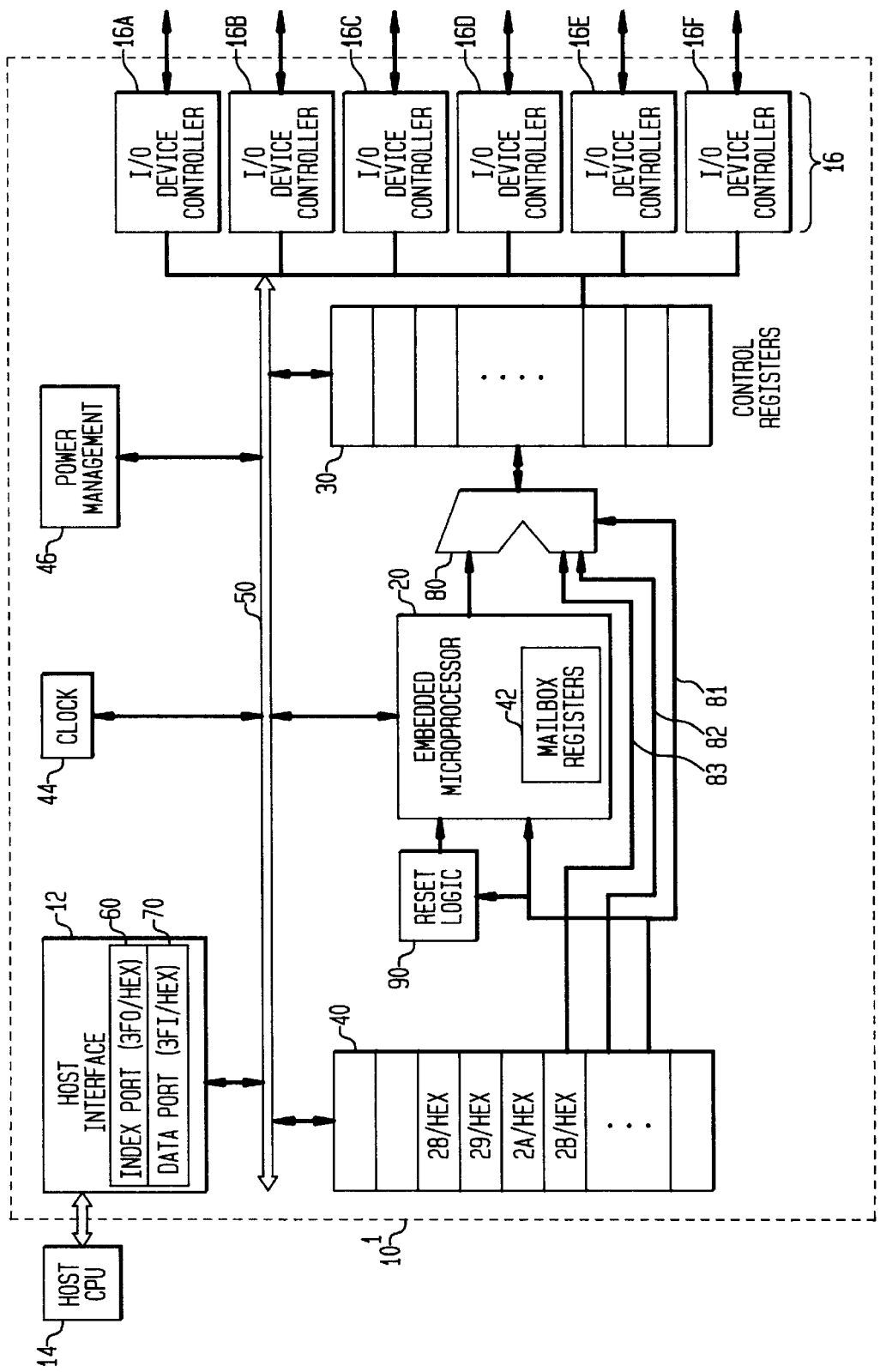
FIG. 3 schematically illustrates the modified data path of the multifunction controller in accordance with the present invention.

A modified multifunction controller chip 10' in accordance with an illustrative embodiment of the invention is shown in FIG. 3. The modified multifunction controller chip 10' is capable of operating in the "bridge mode" in accordance with the invention. In the following discussion, addresses are provided for various registers. These addresses are illustrative only and alternative addresses may be utilized.

The bridge mode involves the use of two configuration ports associated with the host interface 12. These ports are the INDEX PORT 60 and the DATA PORT 70. The INDEX PORT 60 receives from the host CPU 14 the address of a particular register in the configuration registers 40. The DATA PORT 70 receives from the host CPU 14 data to be written into the address contained in the INDEX PORT 60. Alternatively, the DATA PORT 70 receives data read from the address contained in the INDEX PORT 60. Illustratively, in the host CPU address space, the INDEX PORT has address 3F0/Hex and the DATA PORT has address 3F1/Hex.

The bridge mode operates as follows:

(1) The multifunction controller is placed in a configuration state by the host CPU 14 by enabling the INDEX PORT 60 and DATA PORT 70. Then, address 55/Hex is written into the INDEX PORT 60 on two successive I/O write cycles by the host CPU 14.

(2) Once in the configuration state, as described above, the embedded microprocessor 20 is disabled. This is accomplished by the host CPU by writing 2B/Hex into the INDEX PORT 60. Next, the host CPU writes E0/Hex into the DATA PORT 70. As is explained below, E0/Hex represents control information which permits the bridge mode to be used. The data E0/Hex is transferred to the configuration register with address 2B/Hex. Once this operation is complete, the embedded microprocessor (8051) is disabled and it is safe to use the bridge mode. In other words, control information which enables the bridge mode to be used is stored in the register 2B/Hex in the configuration registers 40. This control information disables the embedded microprocessor 20 and enables data to be directly transferred from the configuration registers 40 to the control registers 30 in the manner discussed below.

(3) Illustratively, use of the bridge mode involves setting a 16-bit address in the control registers (which form at least part of the address space of the embedded microprocessor) and then reading or writing the control register at this address. Illustratively, the control registers form a 64k byte address space so that a 16 bit address is utilized. Thus, two one-byte registers in the configuration registers are needed to store this 16-bit address. Illustratively, the two one-byte registers in the configuration registers are 28/Hex and 29/Hex. The high byte of the 16-bit address is set as follows: The host CPU writes the address 28/Hex in the INDEX PORT 60 and the High Bite of the control register address into the DATA PORT 70. The High byte of the control register address is then transferred from the DATA PORT 70 to the configuration register with address 28/Hex. Similarly, the host CPU writes the address 29/Hex into the INDEX PORT 60 and the low byte of the control register address into the DATA PORT 70. The low byte of the control register address is transferred to the configuration register with address 29/Hex. Thus, a 16-bit pointer into the control registers 30 is stored at the addresses 28/Hex, 29/Hex in the configuration registers 40.

(4) Using the INDEX POINTER 60 (3F0/Hex) and DATA POINTER (3F1/Hex), data to be transferred to the specific control register whose address is at 28/Hex, 29/Hex in the configuration registers is transferred to the configuration register address 2A/Hex. Next, the data at configuration register 2A/Hex is transferred to the control register whose address is stored in the configuration registers at addresses 28/Hex, 29/Hex. The data transfer is accomplished via the multiplexer 80. Depending on the information contained in configuration register 2B/Hex, the multiplexer transfers data from the embedded microprocessor to the control registers 30 or information from the configuration register 2A/Hex directly to the configuration register. Specifically, when E0/Hex is in configuration register 2B/Hex, control information is supplied to the multiplexer 80 via line 81. This permits the control register address to be transferred from registers 28/Hex and 29/Hex via line 82 and the data to be transferred via line 83.

It should be noted that the operation described above is an operation in which a control register is written. Alternatively, the bridge mode may be used in a read operation in which data in a control register is transferred to a specific configuration register address. (To accomplish this, a multiplexer may be provided which transfers data from a control register to either the microprocessor 20 or one of the configuration registers 40 depending on the state of a control bit stored in a particular configuration register.) This data may then be transferred using the INDEX PORT 60 and DATA PORT 70 to the host CPU 14.

When the bridge mode data transfers are complete, the bridge mode is exited by clearing configuration register 2B/Hex. This results in removal of the bridge mode control information. This restarts the 8051 embedded microprocessor. A circuit 90 is provided to reset the embedded microprocessor and to resynchronize the clocks of the embedded microprocessor. The configuration mode is then exited by writing a number such as AA/Hex to the INDEX PORT 60.

Figure 1:
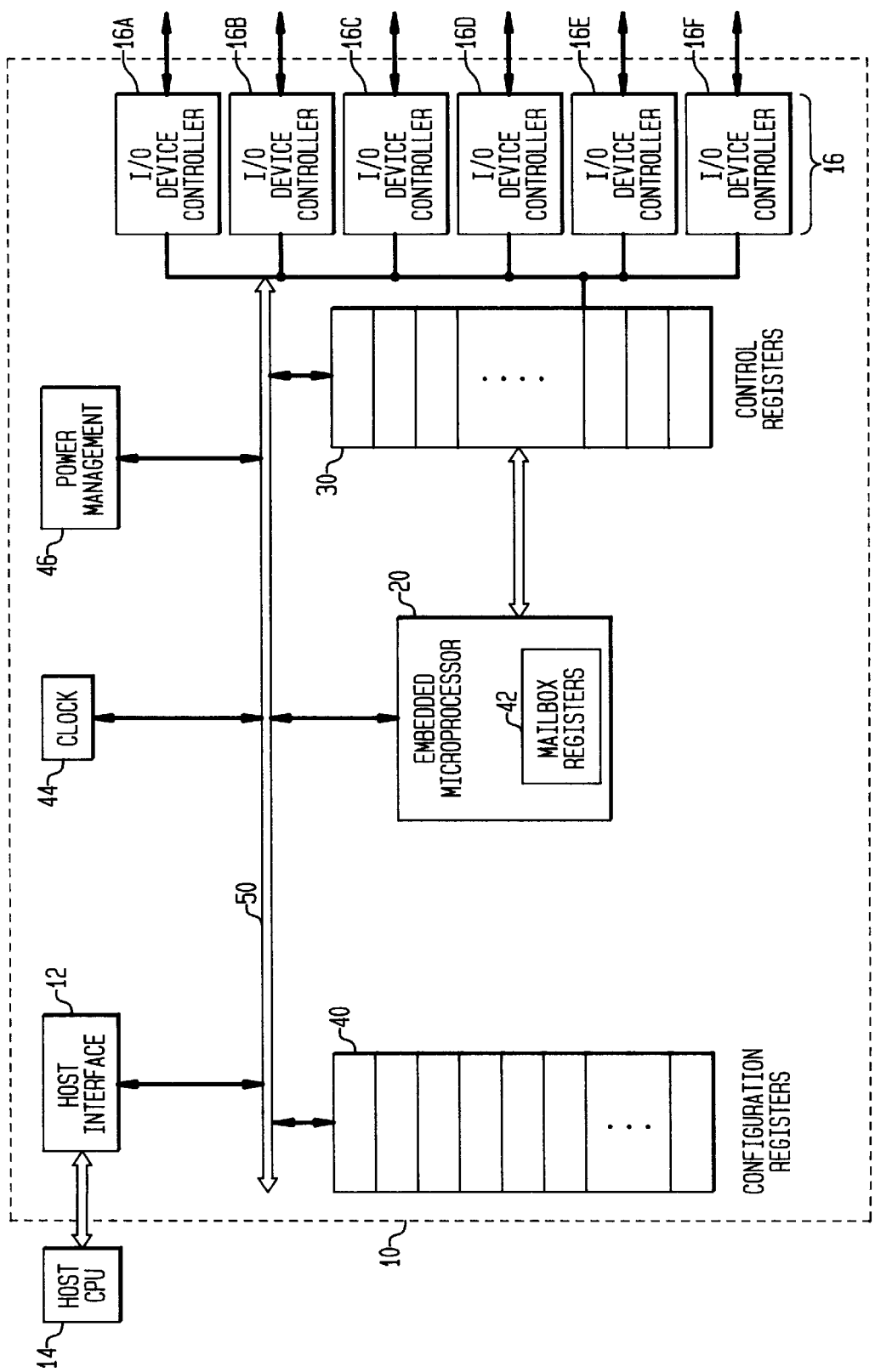
FIG. 1 schematically illustrates the data path of a conventional multifunction controller.
Figure 2:
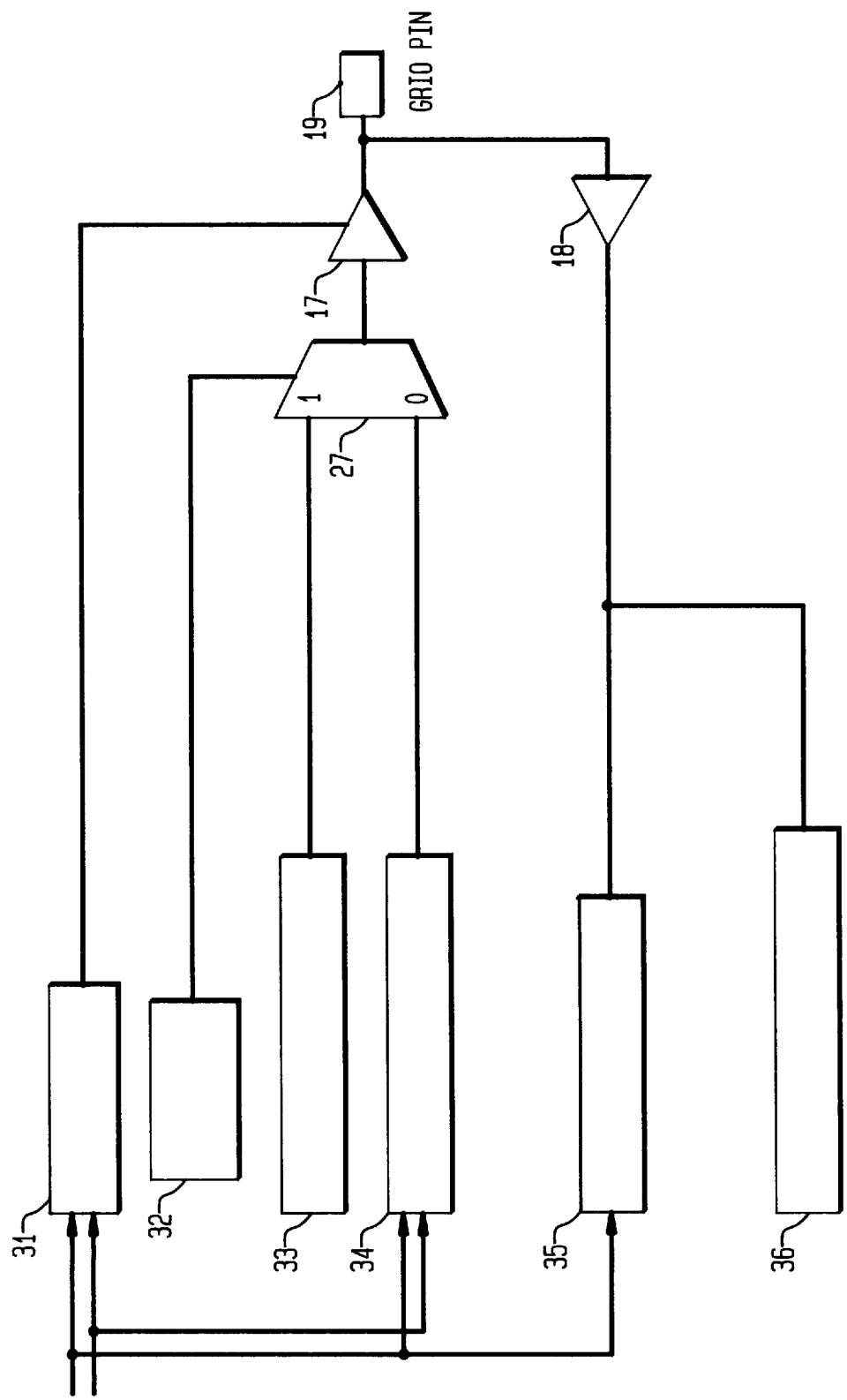
FIG. 2 schematically illustrates one of the independent I/O devices contained in the multifunction controller of FIG. 1.

The bridge mode may be utilized to access at least some of the control registers associated with each I/O device controller 16. For example, the GPIO device of FIG. 2 has control registers 31–36. The registers 31–34 are accessible using the bridge mode. The other registers 35–36 are accessible using other techniques such as via the mailbox registers 42 as discussed above.

The data path of a multifunction controller chip adapted for using the bridge mode includes the following elements in an illustrative embodiment of the invention:

1. Two registers in the I/O space of the host CPU are utilized to access the configuration registers. One of these two registers (e.g., 3F0/Hex) serves as an INDEX PORT for storing an address of a configuration register and the other register (e.g., 3F1/Hex) serves as a DATA PORT for storing data to be transferred to or transferred from the configuration register pointed to by the INDEX PORT.
2. A plurality of registers (e.g., four registers) in the configuration registers including:
   a. one or more registers (e.g., 28/Hex, 29/Hex) for storing a pointer (i.e., an address) in the address space of the embedded microprocessor (i.e., the control registers);
   b. a register (e.g., 2B/Hex) for storing control information for enabling use of the bridge mode. There are three bit positions for control information which are utilized:
      i. a bit for enabling the multiplexer 80;
      ii. bit for resynchronizing the clocks of the embedded microprocessor; and
      iii. a bit for resetting the embedded microprocessor. (These later two bits are utilized when the bridge mode is exited to reset and resynchronize the microprocessor.)
   c. a register (e.g., 2A/Hex) for storing data to be transferred to, or transferred from, the control register pointed to by configuration registers 28/Hex, 29/Hex.
3. Multiplexing circuity for steering the address of registers 28/Hex, 29/Hex and the data of register 2A/Hex into the address space of the embedded microprocessor. The multiplexing circuity is controlled by the MUX control bit stored in configuration register 2B/Hex.

In short, a new technique has been disclosed for giving a host computer access to the address space of the embedded microprocessor of a multifunction controller. Finally, the above described embodiments of the invention are intended to be illustrative only. Numerous alternative embodiments of the invention may be devised by those skilled in the art without departing from the spirit and scope of the following claims.

We claim:

1. A method for operating a multifunction controller circuit, said multifunction controller circuit comprising a host interface for interfacing with a host CPU located externally to said multifunction controller circuit, a plurality of independent devices, a set of control registers for controlling the independent devices, an embedded microprocessor located within said multifunction controller circuit for performing read and write operations in said control registers, and a set of configuration registers accessible to said host CPU and said embedded microprocessor, said control registers being normally accessible to said host CPU via said embedded microprocessor when said embedded microprocessor is executing a program, said method enabling said host CPU to access said control registers without intervention of the embedded microprocessor, said method comprising the steps of:

disabling said embedded microprocessor; and accessing said control registers by said host interface by writing into a first particular location in said configuration registers an address of one of said control registers, and transferring data to said addressed control register from said host interface or from said addressed control register to said host interface via a second particular location in said configuration registers, without intervention of said disabled embedded microprocessor.

2. The method of claim 1 further comprising the step of reenabling said embedded microprocessor after said transfer of data is complete.

3. A method for operating a multifunction controller circuit, said multifunction controller circuit comprising a host interface for interfacing with a host CPU located externally to said multifunction controller circuit, a plurality of independent devices, a set of control registers for controlling the independent devices, an embedded microprocessor located within said multifunction controller circuit for performing read and write operations in said control registers, and a set of configuration registers accessible to said host CPU and said embedded microprocessor, said control registers being normally accessible to said host CPU via said embedded microprocessor when said embedded microprocessor is executing a program, said method enabling said host CPU to access said control registers without intervention of the embedded microprocessor, said method comprising of the steps of:

utilizing said host CPU, writing control information into a first configuration register for disabling said microprocessor and for enabling multiplexing circuitry which allows address information and data to be directly transferred from said configuration registers to said control registers;

utilizing said host CPU, writing an address of a particular control register into one or more second configuration registers; and transferring data via said multiplexing circuitry between one or more third configuration registers and said particular control register, without intervention of said disabled embedded microprocessor.

4. The method of claim 3 further comprising the step of deleting said control information from said first configuration register after said data transfer.

5. The method of claim 3 wherein said host CPU writes said control information into said first configuration register, said address into one or more second configuration registers, and said data into one or more third configuration registers via an index port and a data port in an address space of said host CPU.

6. A multifunction controller chip comprising:

a plurality of independent devices;

a set of control registers for controlling the independent devices;

an embedded microprocessor capable of performing reading and writing operations in said control registers;

a set of configuration registers which are accessible to a host CPU; and multiplexing circuitry which enables data to be transferred between said configuration registers and said control registers without intervention of said embedded microprocessor.

7. The multifunction controller chip of claim 6 wherein said configuration registers are accessible to said host CPU via an index port which stores the address of a configuration register to be accessed and a data port which stores data to be transferred to or transferred from the configuration register whose address is stored in the index port.

8. The multifunction controller chip of claim 6 wherein said embedded microprocessor is disabled and said multiplexer circuitry is enabled when said host CPU writes particular control information into a particular one of said configuration registers.

* * * * *